(12) United States Patent
Chene et al.

(10) Patent No.: US 7,438,144 B2
(45) Date of Patent: Oct. 21, 2008

(54) ELECTRICALLY-POWERED AUTONOMOUS VEHICLE

(75) Inventors: Richard Chene, Neuilly sur Seine (FR); Dominique Delamour, Les Mesnuls (FR); Olivier Rodi, Gambais (FR)

(73) Assignee: R&D Industries, Galluis (FR)

( * ) Notice: Subject to any disclaimer, the term of this patent is extended or adjusted under 35 U.S.C. 154(b) by 296 days.

(21) Appl. No.: 10/554,289

(22) PCT Filed: Apr. 27, 2004

(86) PCT No.: PCT/FR2004/001014

§ 371 (c)(1),
(2), (4) Date: Oct. 25, 2005

(87) PCT Pub. No.: WO2004/096594

PCT Pub. Date: Nov. 11, 2004

(65) Prior Publication Data

US 2007/0012496 A1    Jan. 18, 2007

(30) Foreign Application Priority Data

Apr. 29, 2003    (FR) .................................. 03 05216

(51) Int. Cl.
*B62D 53/04*    (2006.01)
(52) U.S. Cl. ........................ 180/12; 180/11; 180/14.1
(58) Field of Classification Search ........... 180/11, 180/12, 13, 14.2, 14.3, 15, 16, 65.1
See application file for complete search history.

(56) References Cited

U.S. PATENT DOCUMENTS

| | | | | |
|---|---|---|---|---|
| 3,719,244 A | * | 3/1973 | Miller et al. ................ | 180/14.1 |
| 3,825,089 A | * | 7/1974 | Murphy ....................... | 180/12 |
| 4,199,037 A | * | 4/1980 | White ......................... | 180/65.4 |
| 4,346,772 A | * | 8/1982 | Clifft ......................... | 180/11 |
| 4,848,831 A | * | 7/1989 | Buday ........................ | 296/165 |
| 5,351,774 A | * | 10/1994 | Okamoto .................... | 180/65.1 |
| 5,445,236 A | * | 8/1995 | Kuhn .......................... | 180/14.1 |
| 5,531,284 A | * | 7/1996 | Okamoto .................... | 180/65.1 |
| 5,559,420 A | * | 9/1996 | Kohchi ....................... | 180/68.5 |
| 6,390,215 B1 | * | 5/2002 | Kodama et al. ............ | 180/65.3 |
| 6,481,514 B2 | * | 11/2002 | Takada ........................ | 180/11 |
| 6,725,955 B2 | * | 4/2004 | Bidwell ....................... | 180/11 |
| 6,729,421 B1 | * | 5/2004 | Gluck et al. ................. | 180/11 |

(Continued)

FOREIGN PATENT DOCUMENTS

DE    41 05 246    8/1992

(Continued)

*Primary Examiner*—Jeffrey J Restifo
(74) *Attorney, Agent, or Firm*—Young & Thompson

(57) ABSTRACT

For power purposes, an electrically-powered autonomous vehicle requires a mass and/or a significant volume of batteries, the batteries being supported by an independent chassis (4). The independent chassis is designed to be received in a housing (3) which is defined under the chassis of the vehicle and which is provided with at least one wheel (5)-equipped axle. Each of the chassis includes a connection interface, each including the complementary male and female parts of at least one centering member (15) and of at least one socket member (16). The vehicle chassis-side interface has a plate (10) which is independent of the chassis and which is connected to same at least three points, namely: two points which are controlled by jacks (12) and a third point which takes the form of a ball joint.

20 Claims, 8 Drawing Sheets

U.S. PATENT DOCUMENTS 6,758,291 B1 * 7/2004 Koch .................... 180/11
7,273,114 B1 * 9/2007 Rand .................... 180/14.1

FOREIGN PATENT DOCUMENTS

| EP | 0 040 111 | 11/1981 |
| FR | 864 977 | 5/1941 |
| FR | 2 737 694 | 2/1997 |

* cited by examiner

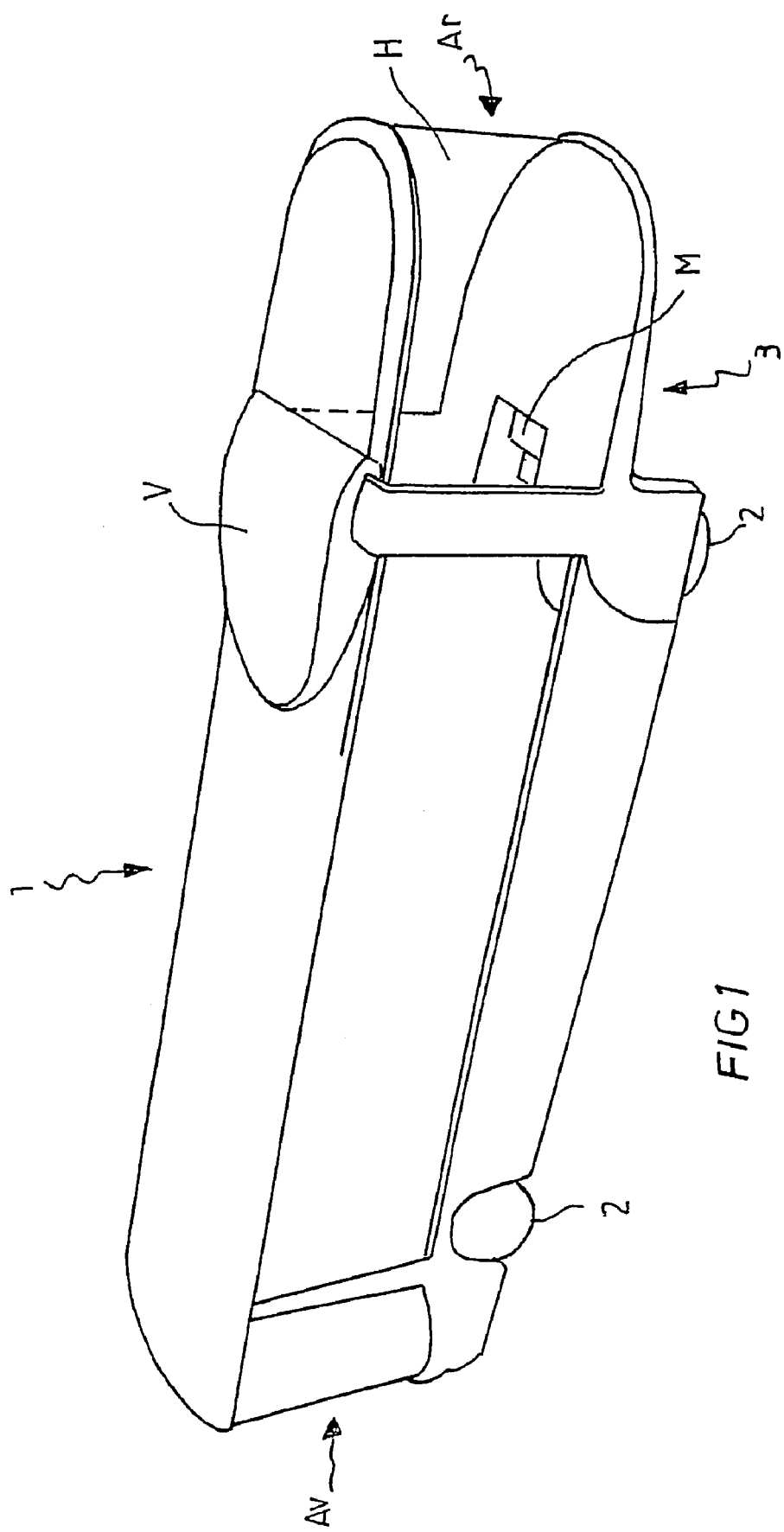

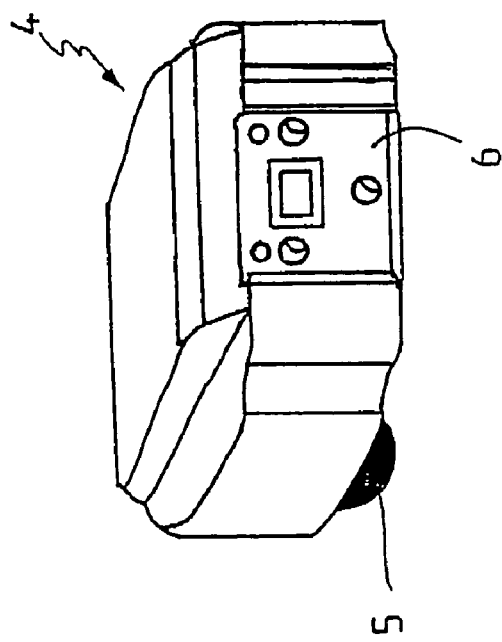
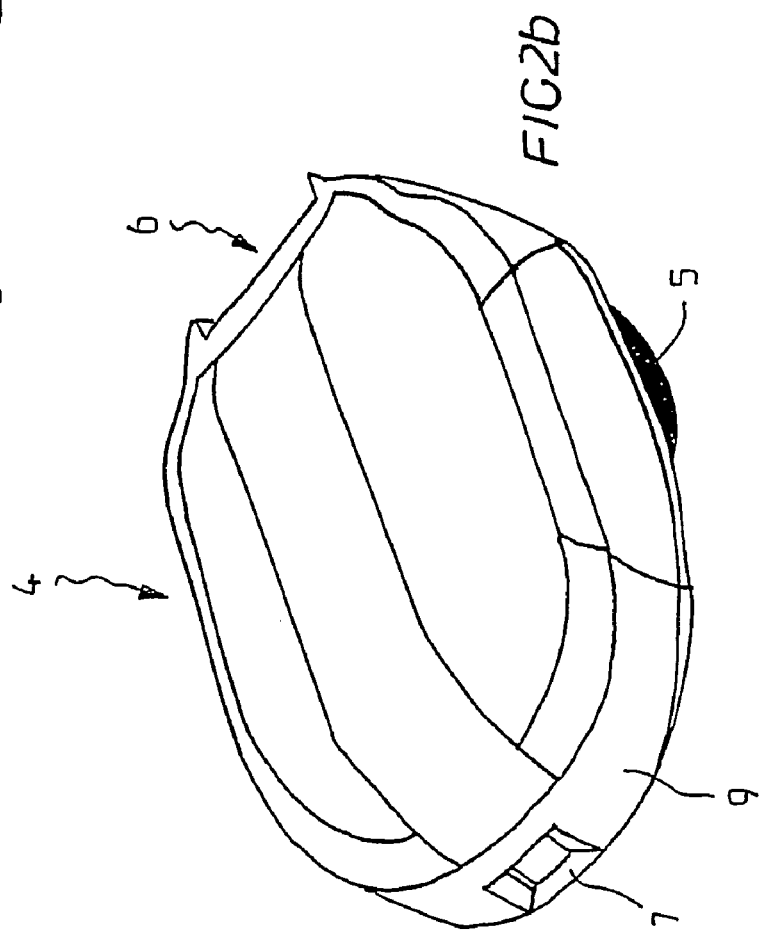

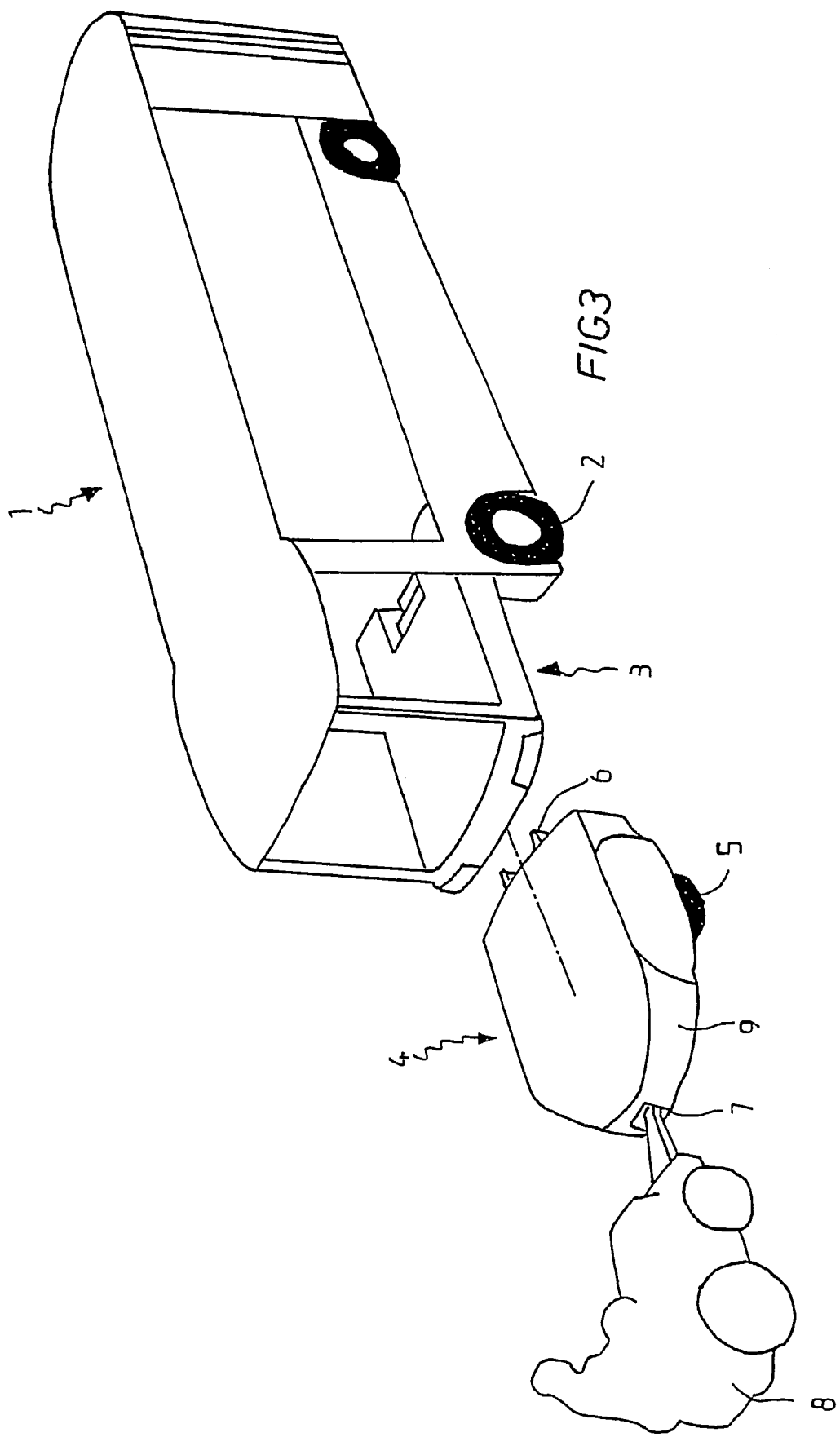

ELECTRICALLY-POWERED AUTONOMOUS VEHICLE

BACKGROUND OF THE INVENTION

The subject of the present invention is an autonomous electrically powered vehicle that, to power it, requires a significant mass and/or volume of batteries, for example a utility vehicle or a public transport vehicle.

In spite of the availability of high-performance batteries (NiMH, lithium-ion, etc.), it is practically impossible to design autonomous vehicles with a large payload capability and which are "all electric", because of the problems of storing the electricity and of the autonomy or range of the vehicle.

Furthermore, one serious obstacle to the introduction into service of electrically powered autonomous vehicles stems from the fact that the technological variation, in terms of batteries, is great, complex, expensive, rapidly surpassed and that the batteries usually require special equipment in servicing and repair shops. These constraints are incompatible with the need of the operators concerned with the transport of individuals and/or goods who need to amortize their investments in rolling stock over a period of between 10 and 20 years.

In order to alleviate the problems of storing electricity and of the autonomy or range of the vehicle, it is necessary at the present time for vehicles equipped with such batteries to be equipped with rapid recharging devices and/or with electric generator sets stored on board the vehicle and able to provide top-up power.

Electrically powered vehicles in which the batteries are installed on a trailer have also been conceived of, for example, in U.S. Pat. No. 3,690,397, DE-A-42 05 327, DE-A-41 05 246 or FR-A-2 482 528.

In the case of an electrically powered utility vehicle, it is necessary to be able to have a significant available energy capacity and therefore a sufficient volume of batteries (ranging between 1.5 and 3 m$^3$). Technical progress means that the trend is for batteries to supply more power for, sometimes, less weight, but their volume remains more or less unchanged. With lead-acid batteries, a volume of about 2 m$^3$ corresponds to a mass of about 3 metric tons.

The prior art recalled above discloses small trailers equipped with a single wheel (the aforementioned U.S. Pat. No. 3,690,397, DE-A-42 05 327 or DE-A-41 05 246), which solution cannot be read across to the trailer-mounting of a significant mass of batteries as mentioned hereinabove, because that would require the use of a wide (of the order of 400 mm wide) wheel of large (of the order of 1200 mm) diameter, the travel of which, if the wheel were to be a pivoting wheel as in U.S. Pat. No. 3,690,397, would considerably reduce the volume available for the batteries. Furthermore, even if the wheel were not a pivoting wheel, as in DE-A-42 05 327, the fact that there was only one wheel would present only disadvantages when applied to a connectable/disconnectable trailer:

lack of stability when handling,
the need to provide complicated, bulky and expensive guidance and suspension means,
the difficulty of maintenance, and
the difficulty of repairing it should it experience a flat.

The aforementioned DE-A-41 05 246 discloses a trailer in which the, non-steered, wheel or wheels is or are situated between the, also non-steered, wheels of the vehicle and on the same transverse axis. The trailer is guided transversely but can move up and down vertically, an elastic device being positioned between the vehicle chassis and the trailer and acting as suspension.

However, this design operates correctly only under ideal conditions because:

when the trailer goes over a speed hump, it may be crushed by the chassis of the vehicle; and
when starting a bend with a cross-fall, the chassis of the vehicle will become inclined transversely with respect to the trailer and considerable loadings will be applied to the trailer transverse guidance device.

In consequence, the operation of the device that forms the subject of DE-A-41 05 246 cannot be considered to be reliable.

The prior art (the aforementioned FR-A-2 482 528) also discloses the addition of a trailer, equipped with a two-wheeled axle, to a utility vehicle, but the size of this trailer is added to that of the vehicle, the result of this being a considerable loss of space when running around and at the depot.

Installing the batteries on an independent chassis makes it possible to conceive of forming, at the vehicle depot, a fleet of charged battery chassis for the purposes of exchanging charged battery chassis for battery chassis that are running out of power, but no document in the prior art either describes or suggests means for making the connecting and disconnecting of the trailer in order to perform such an exchange rapid, particularly when said trailer is situated under the chassis of the vehicle.

SUMMARY OF THE INVENTION

The invention proposes to meet the needs of the operators in terms of the amortizement of their equipment costs by exploiting the principle of dissociating the "batteries" part from the actual vehicle, as has already been conceived of in the prior art, but at the same time remedying the disadvantages and shortfalls of said prior art and doing so by:

incorporating the batteries volume into the vehicle, that is to say by including the trailer within the perimeter of the vehicle (or allowing it to protrude only slightly), without thereby introducing any unevenness in the floor of the vehicle, which needs to be a flat floor; and
allowing rapid interchangeability of trailers (taking around 10 minutes).

These objectives are achieved by the invention which applies to utility vehicles comprising, in a way known per se, batteries supported by an independent chassis which is itself equipped with at least one axle fitted with wheels and which is designed to be accommodated in a housing defined under the chassis of the vehicle, connecting means being provided for connecting the battery chassis and the vehicle chassis, said connecting means comprising, on the one hand, locking means for locking the battery chassis and the vehicle chassis together and, on the other hand, an interface on the battery chassis side and an interface on the vehicle chassis side including connectors for the transmission of power and/or commands or information.

According to the invention, said interfaces each further comprise the complementary male and female parts of at least one centering member and of at least one interconnection member, the interface on the vehicle chassis side consisting of a plate independent of said chassis and joined to it at least three points, two of which are controlled by rams and the third of which adopts the form of a ball joint.

In one practical embodiment, said centering member adopts the form of two complementary male and female parts that interconnect with a taper, and said interconnection member adopts the form of two complementary male and female parts which interconnect in a cylindrical form, said centering member and said interconnection member advantageously consisting of two distinct parts of the same piece.

In the knowledge that the battery chassis has a longitudinal plane of symmetry perpendicular to its axle or axles and a transverse plane perpendicular to said longitudinal plane, the connection device advantageously comprises a pair of interconnection members and a pair of centering members, which pairs are symmetric with respect to said longitudinal plane. Since one centering member of a pair and one interconnection member of a pair may, here again, consist of two separate parts of the same piece, it will be understood that there may be two such pieces symmetric on each side of said longitudinal plane.

The male parts of the centering and interconnection members may be provided on that face of the battery chassis that is designed to be connected to the vehicle chassis and the complementary female parts may be provided on the interface plate, or vice versa.

Whatever the embodiment adopted, by virtue of these interconnection and centering members, the battery chassis can easily be positioned with respect to the vehicle chassis.

In one embodiment of the invention, the locking member consists of a headed threaded rod which passes through the battery chassis, in a direction parallel to its longitudinal plane or to its transverse plane, and which can be secured to the interface plate.

In practice, there may be a pair of such headed threaded rods designed to pass from end to end through the battery chassis and the interface plate, parallel to the longitudinal plane of the battery chassis, and to be held in place by screwing into a nut. Thus, the battery chassis and the interface plate are immobilized between the head of the screws and the nuts, the threaded rods forming through-bolts.

As a preference, the threaded rods are coaxial with said interconnection and/or centering members and pass through them.

As an alternative, there may be a threaded rod designed to pass, parallel to the transverse plane of the battery chassis, through the centering and/or interconnection member(s) and, from one lateral edge to the other, through the interface plate, whereas the complementary parts of said centering and/or interconnection members are coupled, said rod being held in place by screwing into a nut.

Advantageously, the connectors for transmitting power and/or commands or information from the vehicle to the battery chassis are built into said at least one centering and/or interconnection member, and this makes connection faster still, the centering and the interconnection at the same time resulting in the plugging of the male connectors into the female connectors.

As far as the interface plate is concerned, the rams and the ball joint with which it is equipped make it possible to deaden and absorb the variations in alignment or level between the battery chassis and the vehicle chassis which inevitably occur when the assembly is moving along, as a result of unevennesses of the roadway and the like.

In one particular embodiment of the invention, said rams are slaved to the steering of the vehicle and/or to whether the vehicle is traveling forward or backing-up, so that the behavior of the battery chassis can be influenced from the driving position of the vehicle, something which may prove to be particularly useful when operating the vehicle backwards.

In one advantageous embodiment of the invention, the opposite end of the battery chassis to its interface for connection with the vehicle chassis is roughly convex, when said chassis is viewed from above. Such a geometry is better able to absorb rear impacts.

As far as the vehicle propulsion motor is concerned, this may be situated in the vehicle and, as a preference, an auxiliary reserve of batteries is provided in the vehicle so that the vehicle can be moved around over a short journey when disconnected from the battery chassis.

As an alternative, in order to reduce the cost and weight of the vehicle and facilitate maintenance, the vehicle propulsion motor is carried by the battery chassis, the motor power then being transmitted to the vehicle via a driveshaft. In this case, an auxiliary motor may be incorporated into the vehicle so that, once again, it can be moved over a short distance when the battery chassis is detached from it. If the auxiliary motor is an electric motor, then an auxiliary reserve of batteries needs also to be provided in the vehicle.

As indicated above, the battery chassis is housed in a housing defined under the vehicle chassis. This housing may be defined under the rear end of the vehicle chassis, making for ease of access for connecting and disconnecting it.

In this case, the battery chassis may lie within the overall outline of the vehicle or protrude from the rear of the vehicle and be equipped with a bumper and/or impact absorption device in its rear part and/or in its connection device. In this way, the battery chassis protects the rear of the vehicle and/or the end of the housing, from impacts.

In one particular embodiment, the battery chassis is equipped with a connection device situated at the rear of the battery chassis. This arrangement allows this end of the battery chassis to be coupled to equipment for handling it, for the purposes of connecting or disconnecting the other end to or from the vehicle chassis.

The battery chassis may furthermore be either equipped with a charger, allowing the batteries to be recharged wherever the charger can be plugged in to an electrical supply (the terminus or an intermediate stop along the line), or support an energy conversion device able to recharge the batteries. This device may be an alternator operated by a combustion engine or inertia flywheels, and this amounts to equipping the chassis with an electrical generator set capable of recharging the batteries on demand and therefore of extending the range of the vehicle.

BRIEF DESCRIPTION OF THE DRAWINGS

The invention will be better understood from reading the detailed description hereinafter of the attached drawings in which:

FIG. 1 is a schematic depiction of an electrically powered autonomous vehicle according to the invention, without the battery chassis;

FIGS. 2a and 2b are schematic depictions of the battery chassis according to the invention, seen from the end for connection to the vehicle chassis (FIG. 2a), and from the end for connection to the handling equipment (FIG. 2b);

FIG. 3 is a schematic depiction of the installing of the battery chassis in the housing of the electrically powered autonomous vehicle of the invention;

DETAILED DESCRIPTION OF THE PREFERRED EMBODIMENTS

Figure 4:
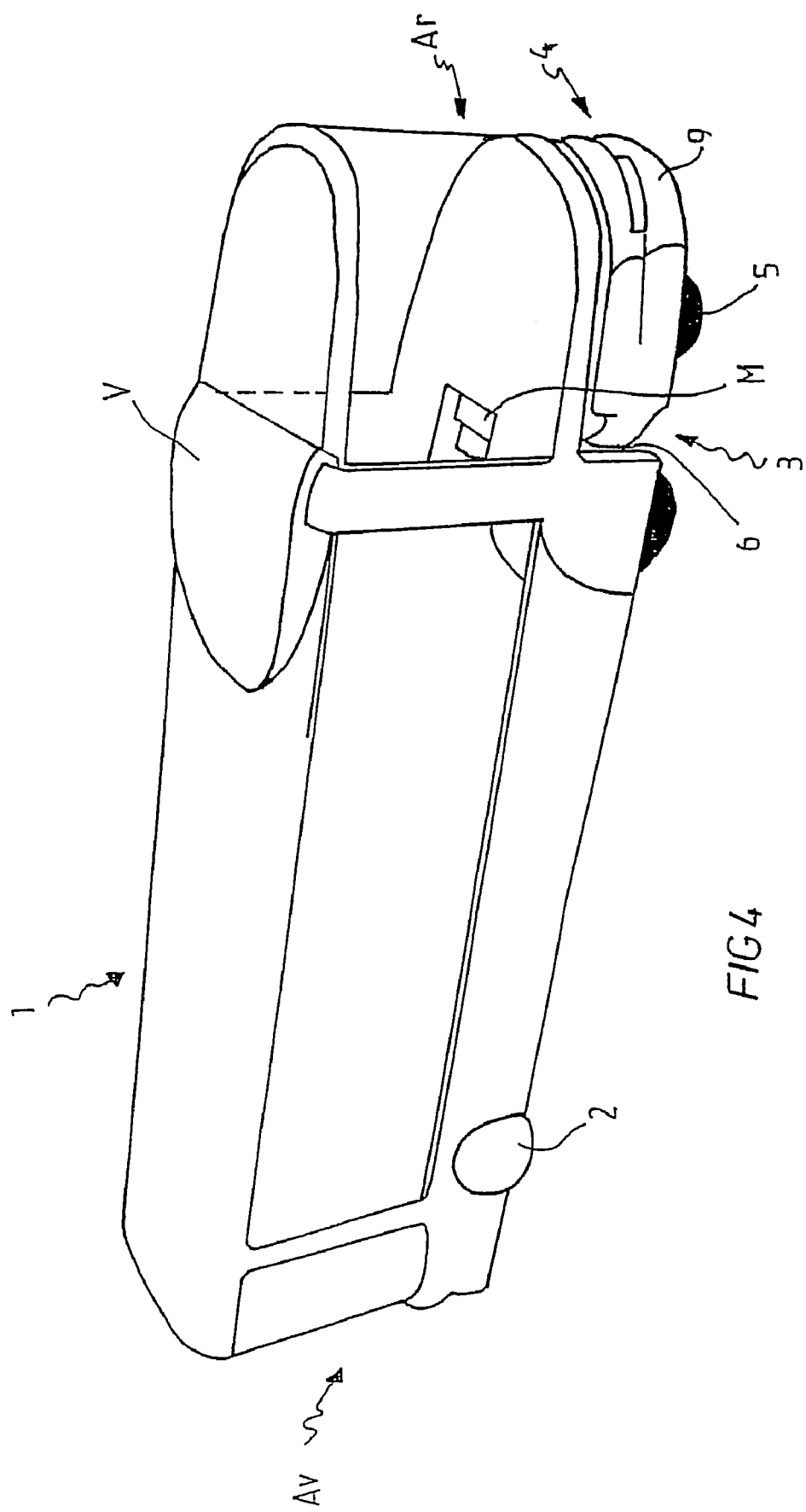
FIG. 4 is a schematic depiction of the electrically powered autonomous vehicle according to the invention, with the battery chassis in place.

FIG. 1 depicts an electrically powered autonomous vehicle 1 comprising a chassis equipped with two axles each fitted with one pair of wheels 2, and the front of which is denoted by Av and the rear by Ar. The vehicle chassis defines, at the rear, a housing 3 situated under a raised cabin part H and designed to accommodate a battery chassis.

The vehicle motor is situated between the wheels of the vehicle (under the steps M of the stairs in the embodiment depicted) or, better still, in the wheels themselves (electric motorized wheels are known in the art and there is no need to describe these here). The volume V available on the roof may be used to house cooling devices, on-board computer equipment and/or an additional reserve of power. It is also possible for equipment specific to the use, for example air-conditioning means, alcohol-fired, gas-fired or fuel-fired heating means (in the current state of the art, electric vehicles are not generally electrically heated because of the bulk, weight and cost of the batteries), antennas and other information transmission systems, to be housed here. Arranging these on the roof in this way obviously frees up more useful volume for passengers.

The battery chassis 4 is depicted in isolation in FIGS. 2*a* and 2*b*. As can be seen, this is an independent trailer equipped with an axle fitted with a pair of wheels 5 and having, at one of its ends, means 6 of mechanical connection (which will be described in detail with regard to FIGS. 6 to 9) and electrical and electronic means of coupling to the vehicle chassis (FIG. 2*a*) and, at its opposite end (FIG. 2*b*), means 7 of mechanical coupling to equipment for handling it. The chassis 4 is equipped with a bumper 9. The wheels 5 may advantageously be equipped with braking devices or retarders. Furthermore, the battery chassis is equipped with safety devices and auxiliary means necessary for the correct operation of said batteries, particularly for monitoring and maintaining the temperature and providing ventilation.

FIG. 3 depicts the installation of the battery chassis 4 in the housing 3 of the electrically powered autonomous vehicle 1. As can be seen, the battery chassis 4 is connected by its coupling means 7 to equipment 8 handled by an operator. This equipment 8 pushes the battery chassis 4 into the housing 3 until its mechanical coupling means and electrical coupling means 6 engage with mating means provided in the end of the housing and not depicted in this figure.

FIG. 4 shows the battery chassis engaged in the housing 3.

As can be seen, from FIG. 4, the wheels 5 of the axle of the battery chassis 4 are positioned in the continuation of the wheels 2 of the axles of the chassis of the vehicle 1 so that they run more or less in the wheel marks of the former. It will also be noticed that the overall appearance of the vehicle according to the invention is roughly the same as that of current buses.

Figure 5:
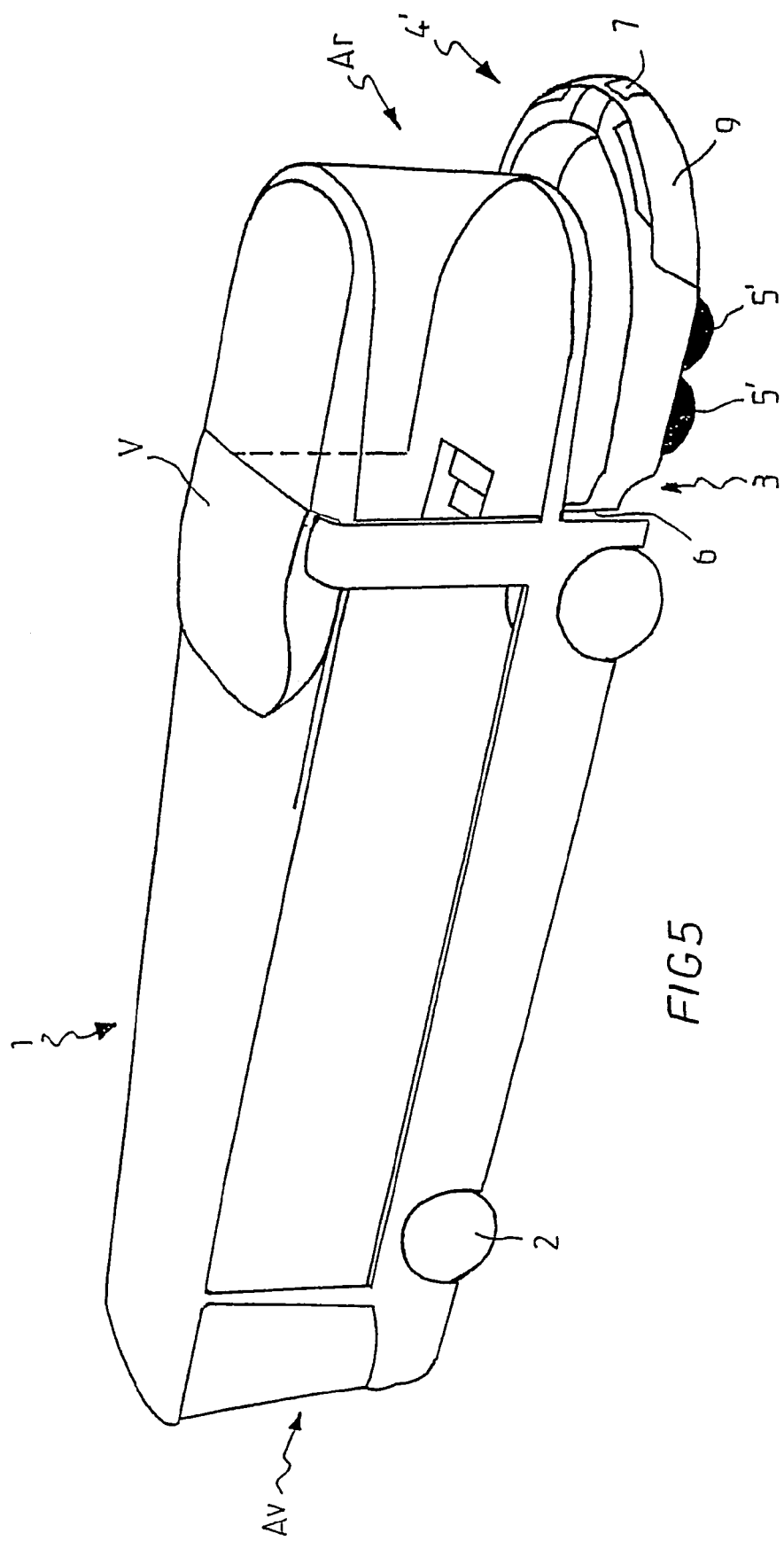
FIG. 5 is a schematic depiction of the electrically powered autonomous vehicle according to the invention, equipped with a battery chassis according to an embodiment variant.

In the variant of FIG. 5, use is made of a chassis 4' which differs from the chassis 4 in that it comprises two axles each of which is fitted with a pair of wheels, such as 5', and in that it is longer than the chassis 4. The chassis 4' therefore protrudes beyond the rear of the vehicle. A lengthened chassis such as this is able to accommodate more batteries and the additional batteries could be supported by larger wheels instead of by more numerous wheels, as depicted here. Of course, one and the same vehicle may, as need be, be equipped with a short or with a long battery chassis, equipped with conventional batteries or fuel cells, without requiring modification.

Figure 6:
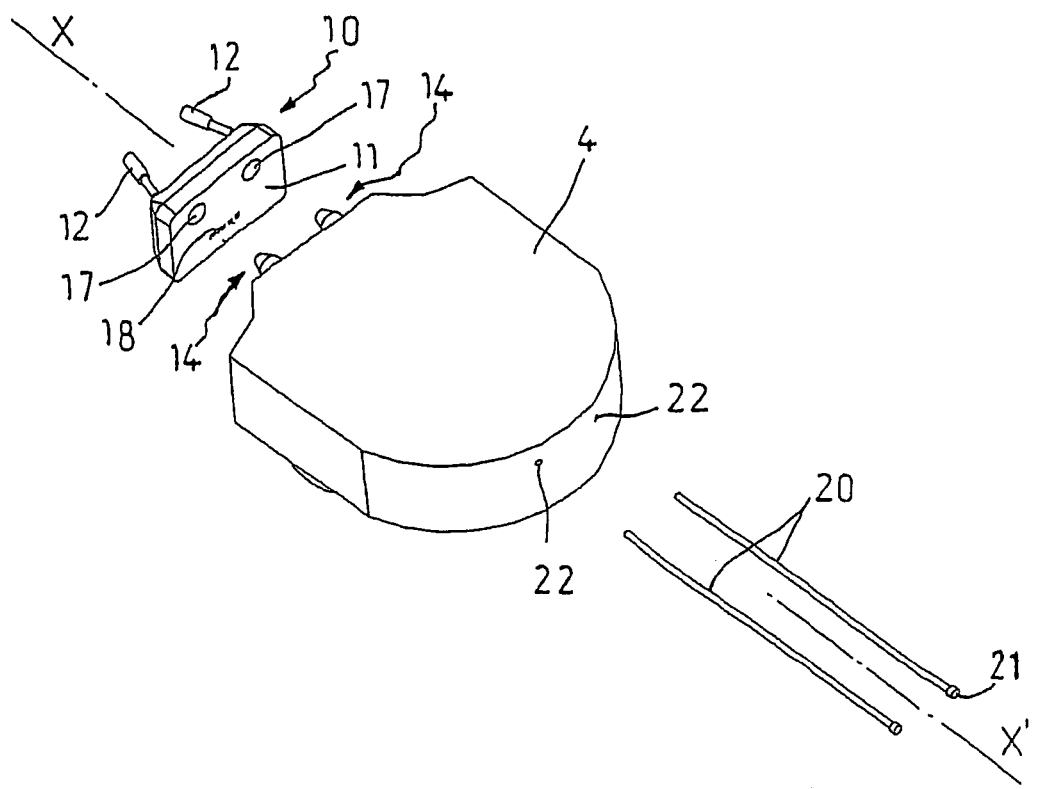
FIG. 6 is an exploded perspective view of one embodiment of the battery chassis and of the interface plate, both viewed from the end for connection to equipment for handling the battery chassis.
Figure 7:
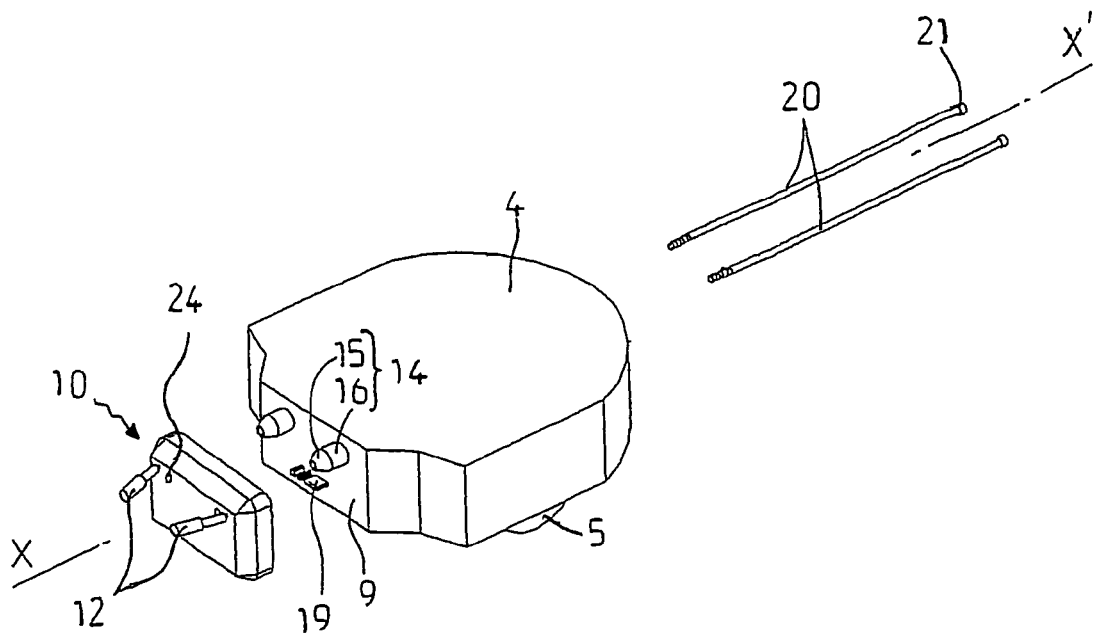
FIG. 7 is a perspective view of the same elements as in FIG. 6, but seen from the opposite direction.
Figure 8:
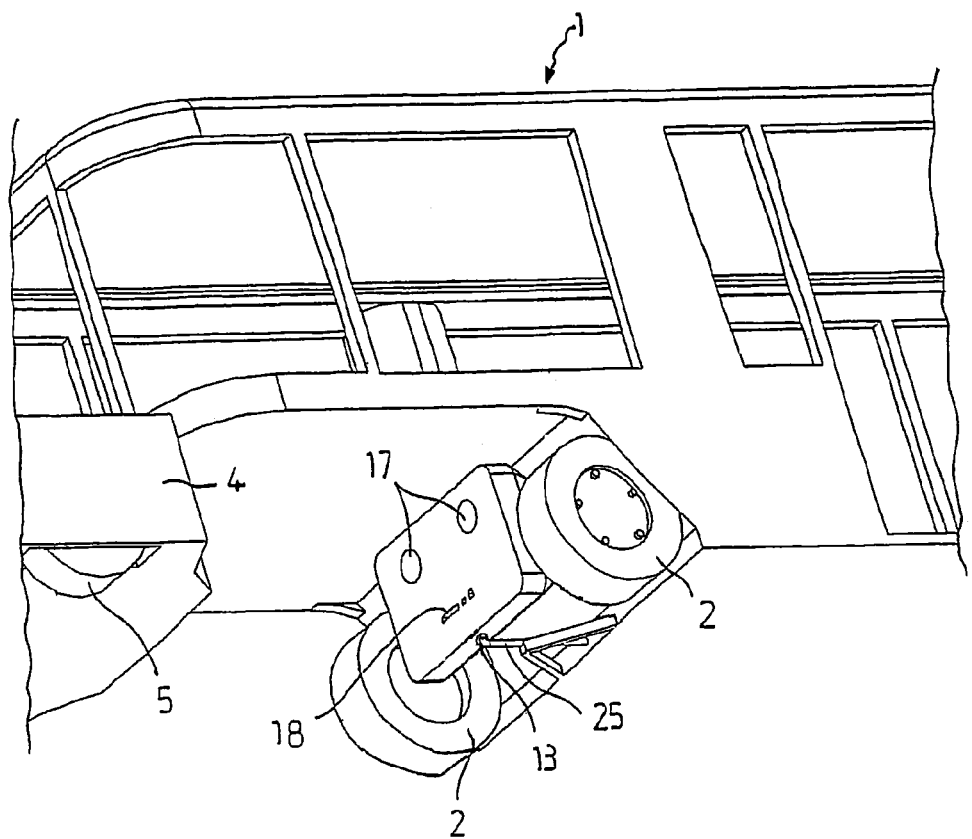
FIG. 8 is a partial perspective view of the vehicle chassis, viewed from beneath, with the interface plate in place.

Moving on to FIGS. 6 to 8, these more clearly show the battery chassis-side interface and the vehicle chassis-side interface. The interface on the battery chassis 4 side consists of the end face 9 of said chassis from which there project the mechanical, electrical and other coupling means, denoted by 6 in the previous figures. The interface on the vehicle chassis side consists of a plate 10 offering a face 11 designed to accept said coupling means and which is secured to the vehicle chassis by two rams 12 and a ball joint 13 (see FIG. 8).

More specifically, the mechanical coupling means consist, on the battery chassis 4 side, of a pair of male pieces 14 which comprise a tapered region 15 forming a centering member and a cylindrical region 16 forming an interconnection member. These pieces 14 are symmetric with respect to the longitudinal plane of symmetry of the battery chassis 4 labeled X-X'. Corresponding to this pair of male pieces 14 is a pair of cavities 17 with the same geometry provided in the face 11 of the interface plate 10, which face 11 also comprises sockets, such as 18, designed to accept the plugs 19 projecting from the interface and transmitting power together with commands and information.

The battery chassis 4 and the plate 10 are secured together by means of a pair of headed 21 threaded rods 20 which are first of all passed through passages formed in the battery chassis 4 and emerge, on one side, on the opposite face of the chassis to the face 9, at 22 and, on the other side, in the center of the pieces 9, then in passages formed in the plate 10 and which emerge, on the face 11, and, on the opposite face, at 24, after which the ends of said rods, that is the opposite end to the end comprising the head 21, is screwed into a nut, not depicted.

The length of the rams 12 and of the support 25 of the ball joint 13 easily allows such screwing or unscrewing. Of course, when the battery chassis 4 is disconnected from the plate 10, it is not essential to extract the rods 20 from said chassis.

Figure 9:
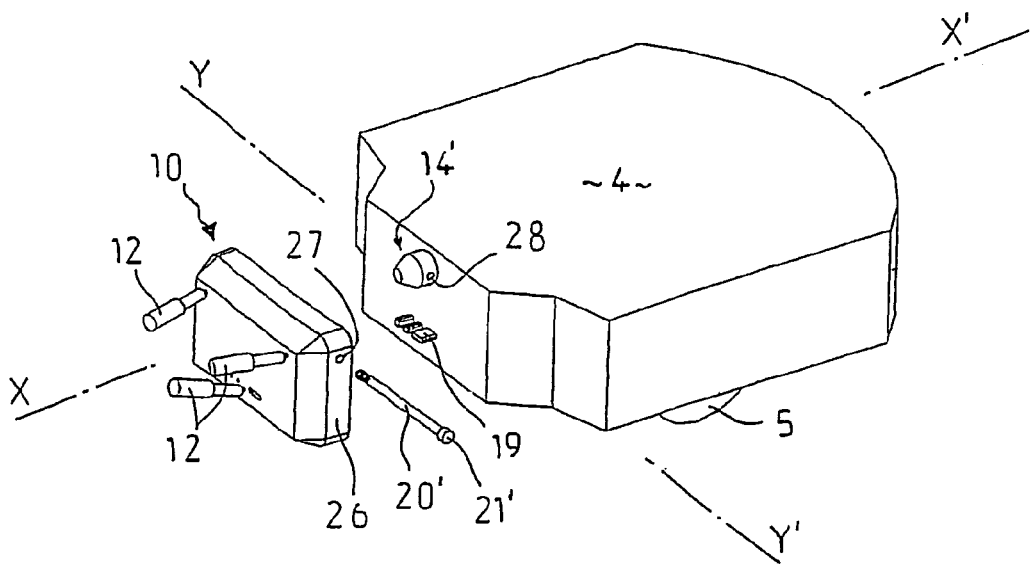
FIG. 9 is a view similar to FIG. 7 but relating to another embodiment of the invention.

The embodiment depicted in FIG. 9 differs from the previous one in that it has just one male centering and interconnection piece 14' positioned on the longitudinal plane X-X' of the battery chassis 4, in that the interface plate 10 is connected to the vehicle chassis by three rams 12 rather than two, and through the means of locking the battery chassis 4 and the interface plate 10 together. This time, use is made of a single threaded rod 20' with a head 21' designed to pass, on the one hand, through the plate 10 via a passage extending from one lateral face 26 thereof to the other and emerging at 27, on the visible face 26 and, on the other hand, when the male centering and interconnection piece 14' is coupled to a corresponding cavity formed in the plate 10, said male piece via a passage formed transversely in said piece and only the opening 28 of which can be seen in FIG. 9, the opposite end of the rod 20' to the end bearing the head 21' being screwed into a nut, not depicted.

Figure 10:
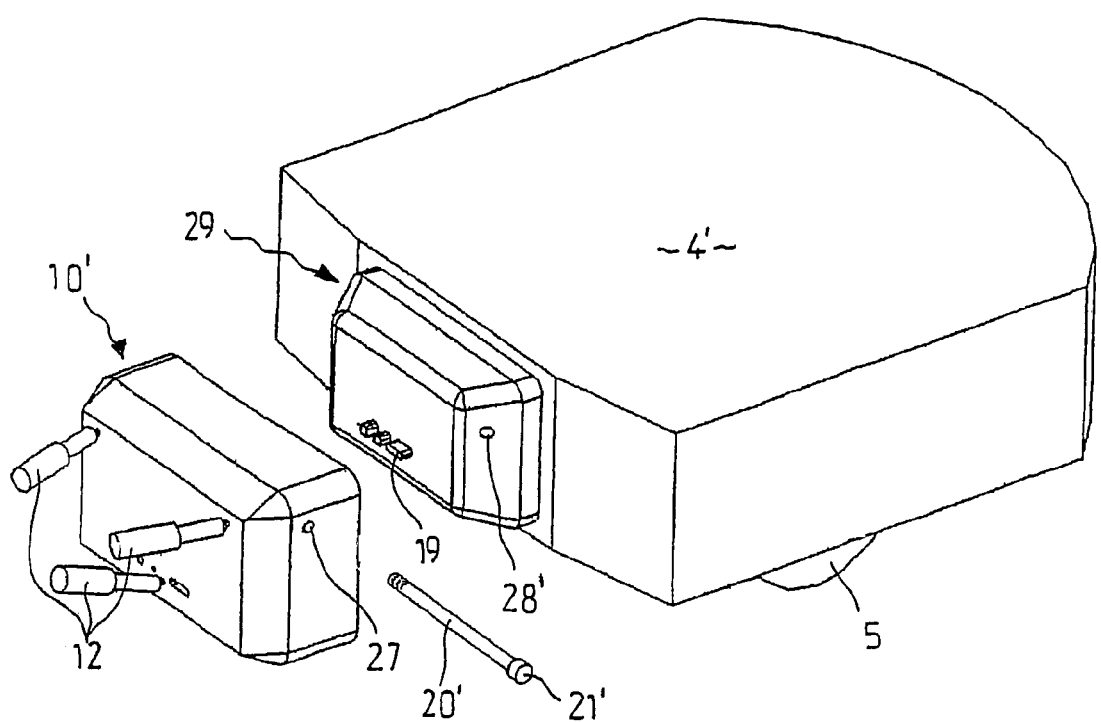
FIG. 10 is a view similar to FIG. 9 but showing another embodiment of the centering and interconnection members.

The embodiment depicted in FIG. 10 differs from that of FIG. 9 in that the centering and interconnection members belonging to the chassis 4' consist not of a cylindro-frustoconical piece 14' but of a part 29 in the shape of a pyramid frustum which fits into a cavity of corresponding geometry formed on the non-visible face of the plate 10'.

Figure 11:
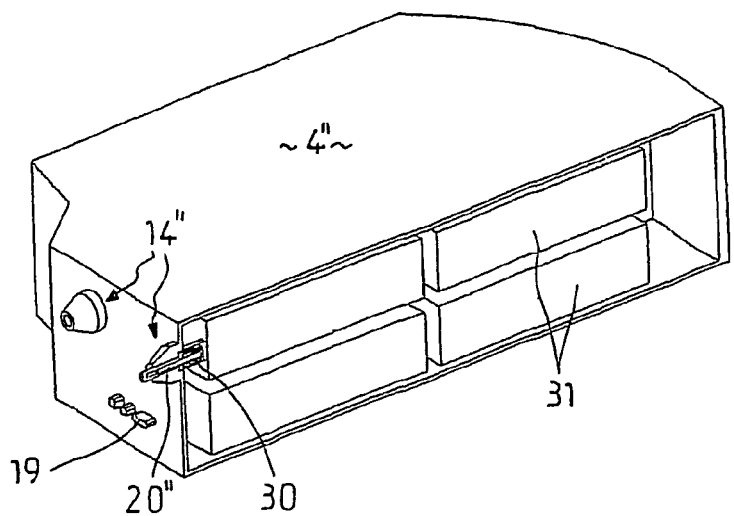
FIG. 11 is a perspective and sectioned view of yet another embodiment of the battery chassis.

Finally, FIG. 11 illustrates an embodiment variant of the embodiment 4" of the battery chassis depicted in FIG. 7: instead of having two long threaded through-rods 20 that can be turned by hand, this variant comprises a pair of short threaded rods 20", each of which can be turned by an electric motor 30 and which are housed in each of the centering and interconnection members 14". Thus, the operations of connecting and disconnecting the battery chassis with respect to the vehicle chassis are quicker and can be commanded from the cab of the vehicle or automated. That furthermore avoids having to have the threaded rods pass through the entire length of the chassis.

The reference 31 denotes the batteries carried by the battery chassis.

Whatever the embodiment adopted, by operating the rams 12 it is possible to alter the adhesion of the vehicle's driving wheels 2: by "raising" the battery chassis using the rams 12, the wheels 5 of said chassis are effectively relieved of some of their load, and this load is transferred onto said wheels 2.

Furthermore, it will be understood that the mass of the batteries, such as 31, can be spread over the battery chassis in a way that is balanced with respect to the wheels 5 of said chassis, so as to make this said chassis easier to handle once the chassis has been disconnected from the vehicle chassis.

The present invention is not restricted to the embodiments described and depicted. In particular, the motor of the vehicle could itself too be carried by the chassis 4 or 4', in which case an auxiliary motor would be provided in the vehicle so that it can be moved over short distances when in the configuration of FIG. 1. Furthermore, the electric vehicle does not necessarily have four wheels as depicted: it must have at least three, and may have more than four. It may in point of fact be a high-capacity vehicle with double or triple axles.

Aside from its technical advantages, the solution put forward has one commercial advantage: specifically, by dissociating the batteries and their support from the vehicle, it becomes possible, while still falling into the same vehicle weight category for regulation purposes, to expand the volume of the passenger space and increase the number of passengers.

The invention claimed is:

1. An autonomous electrically powered vehicle that requires, to power it, a significant mass and/or volume of batteries, said batteries being supported by an independent chassis which is itself equipped with at least one axle fitted with wheels and which is designed to be accommodated in a housing defined under the chassis of the vehicle, the battery chassis having a longitudinal plane of symmetry perpendicular to its axle or axles and a transverse plane perpendicular to said longitudinal plane, and connecting means being provided for connecting the battery chassis and the vehicle chassis, said connecting means comprising locking means for locking the battery chassis and the vehicle chassis together, and an interface on the battery chassis side and an interface on the vehicle chassis side including connectors for the transmission of power and/or commands or information, wherein said interfaces each further comprise the complementary male and female parts of at least one centering member and of at least one interconnection member, the interface on the vehicle chassis side consisting of a plate independent of said chassis and joined to it at least three points, two of which are controlled by rams and the third of which adopts the form of a ball joint.

2. The vehicle as claimed in claim 1, wherein said rams are slaved to the steering of the vehicle and/or to whether the vehicle is traveling forward or backing-up.

3. The vehicle as claimed in claim 1, wherein said centering member adopts the form of two complementary male and female parts that interconnect with a taper.

4. The vehicle as claimed in claim 1, wherein said interconnection member adopts the form of two complementary male and female parts which interconnect in a cylindrical form.

5. The vehicle as claimed in claim 1, wherein said centering member and said interconnection member consist of two distinct parts of the same piece.

6. The vehicle as claimed in claim 1, wherein said connecting means comprises a pair of interconnection members and a pair of centering members, which pairs are symmetric with respect to the longitudinal plane of the battery chassis.

7. The vehicle as claimed in claim 1, wherein said locking means consists of a headed threaded rod which passes through the battery chassis, in a direction parallel to its longitudinal plane or to its transverse plane, and which can be secured to the interface plate.

8. The vehicle as claimed in claim 1, wherein said locking means comprises a pair of headed threaded rods designed to pass from end to end through the battery chassis and the interface plate, parallel to the longitudinal plane of the battery chassis, and to be held in place by screwing into a nut.

9. The vehicle as claimed in claim 1, wherein:
said connecting means comprises a pair of interconnection members and a pair of centering members, which pairs are symmetric with respect to the longitudinal plane of the battery chassis;
said locking means comprises a pair of headed threaded rods designed to pass from end to end through the battery chassis and the interface plate, parallel to the longitudinal plane of the battery chassis, and to be held in place by screwing into a nut, said threaded rods being coaxial with said interconnection and/or centering members and passing through them.

10. The vehicle as claimed in claim 1, wherein said locking means comprises a threaded rod designed to pass, parallel to the transverse plane of the battery chassis, through the centering and/or interconnection member(s) and, from one lateral edge to the other, through the interface plate, whereas the complementary parts of said centering and/or interconnection members are coupled, said rod being held in place by screwing into a nut.

11. The vehicle as claimed in claim 1, wherein said connectors for transmitting power and/or commands or information are built into said at least one centering and/or interconnection member.

12. The vehicle as claimed in claim 1, wherein the opposite end of the battery chassis to its interface for connection with the vehicle chassis is roughly convex, when said chassis is viewed from above.

13. The vehicle as claimed claim 1, wherein said battery chassis is equipped with a connection device situated at the rear of said battery chassis.

14. The vehicle as claimed in claim 1, in which said housing is defined under the rear end of the vehicle chassis, wherein, in service, said battery chassis protrudes beyond the rear of the vehicle and is equipped with a bumper and/or impact absorption device in its rear part.

15. The vehicle as claimed in claim 1, wherein the battery chassis furthermore supports a battery charger.

16. The vehicle as claimed in claim 1, wherein the battery chassis furthermore supports an energy conversion device capable of recharging said batteries.

17. The vehicle as claimed in claim 1, wherein said propulsion motor is carried by said vehicle.

18. The vehicle as claimed in claim 1, wherein said propulsion motor is carried by said battery chassis, the motive power being transmitted to the vehicle via a driveshaft.

19. The vehicle as claimed in claim 1, wherein it incorporates an auxiliary motor allowing it to be moved around independently of its connection to said battery chassis.

20. The vehicle as claimed in claim 1, wherein an auxiliary reserve of batteries is provided in the vehicle.

* * * * *